United States Patent [19]

Vidakovic et al.

[11] 4,010,789
[45] Mar. 8, 1977

[54] ANCHOR PLATE TIRE

[75] Inventors: Aleksandar Vidakovic; Rodney H. Anderson, both of Libertyville, Ill.

[73] Assignee: International Harvester Company, Chicago, Ill.

[22] Filed: Sept. 2, 1975

[21] Appl. No.: 609,471

[52] U.S. Cl. .............. 152/182; 152/191; 152/199; 152/226; 305/19; 305/54

[51] Int. Cl.² ............ B60C 27/20; B62D 55/28

[58] Field of Search ......... 152/169, 180, 182, 185, 152/187, 190, 191, 198, 199–201, 226–230; 305/15, 29, 39, 19, 57, 54

[56] References Cited

UNITED STATES PATENTS

| | | | |
|---|---|---|---|
| 3,773,394 | 11/1973 | Grawey | 305/19 |
| 3,899,220 | 8/1975 | Grawey et al. | 152/182 |

*Primary Examiner*—Drayton E. Hoffman
*Attorney, Agent, or Firm*—Douglas W. Rudy; Floyd B. Harman

[57] ABSTRACT

A pneumatic spacer and cushioning tire assembly is provided with a carcass component and a tread section component. A plurality of anchor plates are molded into the tire carcass in the crown section thereof. The anchor plates are further retained in position on the tire carcass by an elastomer insulated inextensible filament reinforced ply composed of a plurality of inextensible filaments which comprise a portion of the tread section component.

The anchor plates are equipped with fastener receiving means which are provided to allow the fastening of traction plates to the anchor plates. Traction plates, once attached firmly to the anchor plates, protect the tire from damage as well as providing increased traction.

The complete tire assembly provides an armored resilient ground engaging unit for use on construction equipment.

10 Claims, 10 Drawing Figures

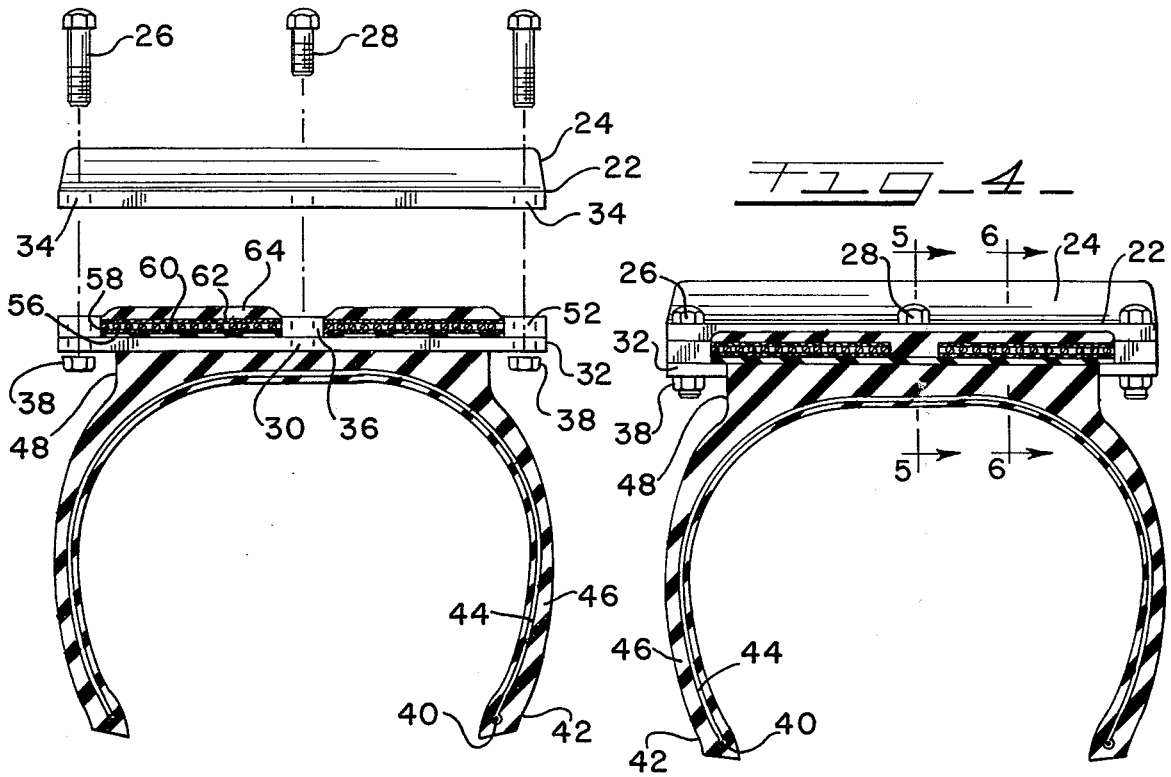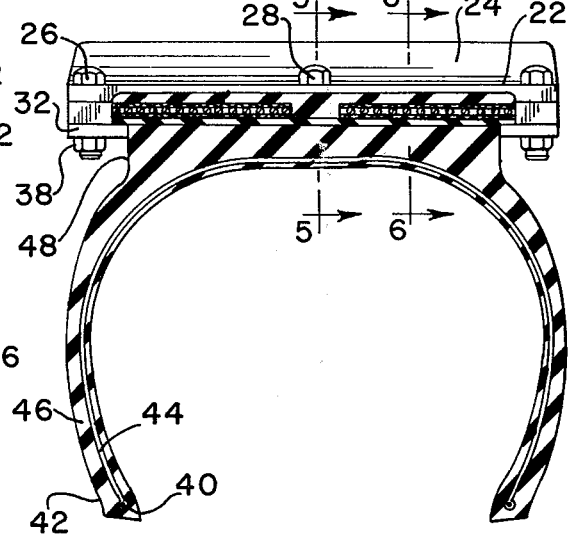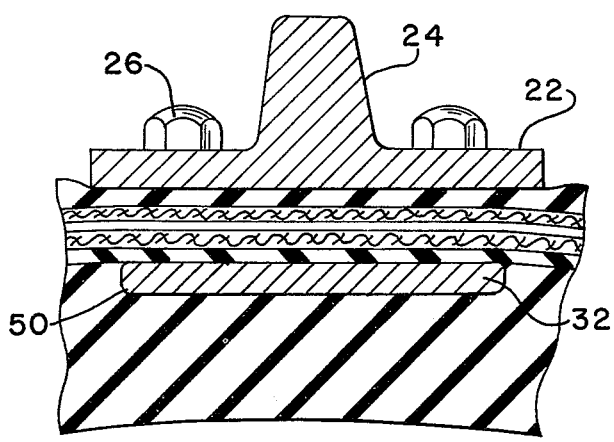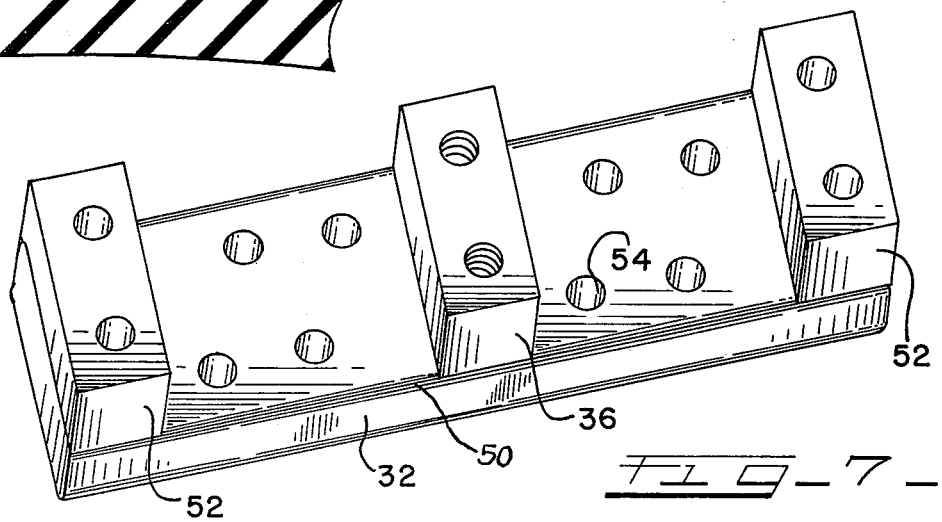

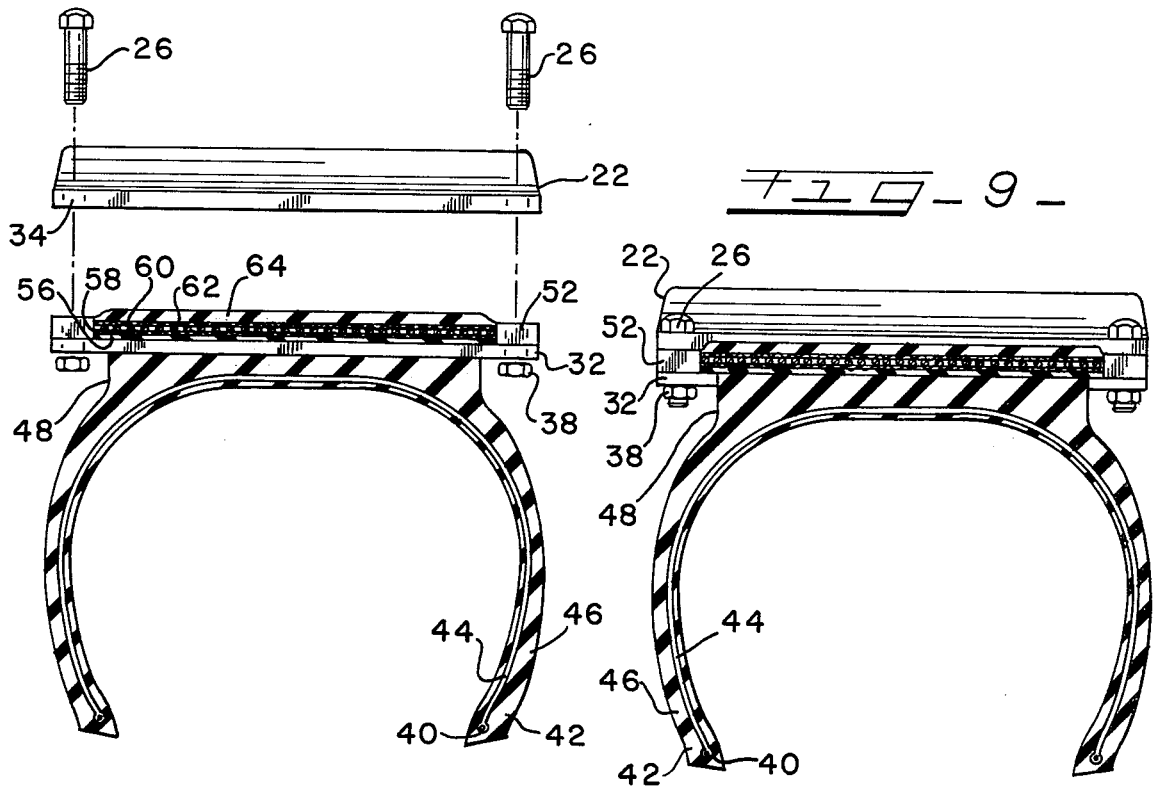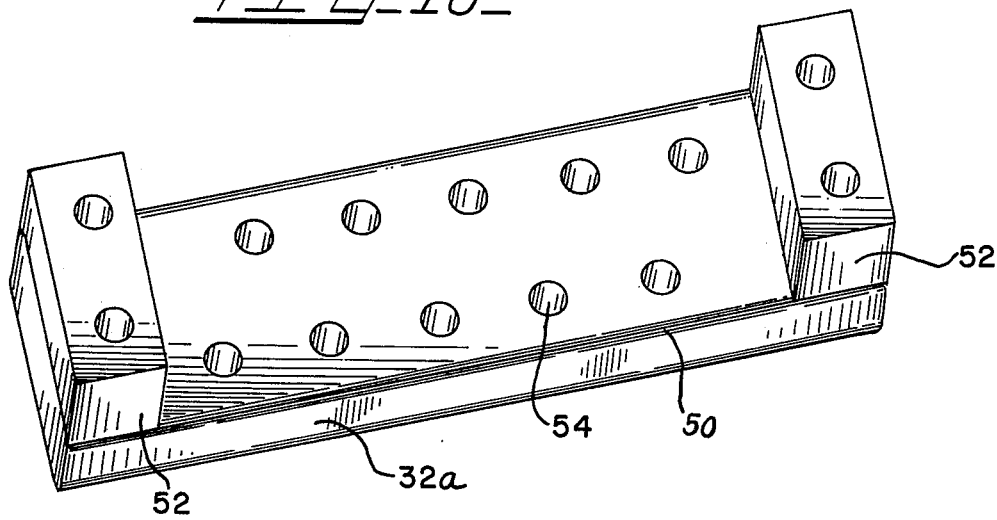

ANCHOR PLATE TIRE

CROSS-REFERENCES TO RELATED APPLICATIONS

This application is related to the application entitled ANCHOR PLATE TIRE HAVING A SUB-LUG EQUIPPED ANCHOR PLATE Ser. No. 609,472, filed Sept. 2, 1975, invented by Aleksandar Vidakovic which was filed on the same day as this application.

BACKGROUND OF THE INVENTION

1. Field of the Invention:

This invention relates to armored tires having a traction plate equipped ground engaging surface. More specifically this invention is concerned with the implantation of anchor plates in the carcass of a tire to provide a mounting means for the traction plates. The anchor plates are molded between the inner plies of the tire and an elastomer insulated fabric and inextensible filament anchor ply structure.

DESCRIPTION OF THE PRIOR ART

Pneumatic tired vehicles which work in construction and other harsh environents are oftentimes driven on extremely detrimental road surfaces. Numerous articulated and conventional loaders, scrapers, dump trucks and graders, etc. operate in rock quarries, mines, foundries, refuse yards and other sites where the tires of the vehicle are continually exposed to puncture producing and wear inducing elements.

As the tires for large construction type vehicles are expensive it is economically advantageous to minimize exposure to tire damaging elements. One way that this tire wear problem may be alleviated is through the use of endless track vehicles. Conventional two tracked vehicles are equipped with endless tracks made up of traction or grouser plates and linking members which are normally driven by sprocketed wheels. Two track vehicles have high tractive efficiency, good stability, and good floatation characteristics while also having the advantage of infrequent track failure resulting from damage caused by the working environment. Bulldozers, power shovels, and cranes are often seen with dual endless track ground engaging means.

Conversely, endless track vehicles do have certain disadvantages that make them undesirable in some material handling situations. Two track vehicles have speed limitations due to the track assembly and are not capable of adequately dampening road shocks and vibrations. The amount of heat generated by the track links may be severe enough at high speeds to cause premature failure of the tracks.

In a vehicle having pneumatic tires the tires are capable of relatively high speed while also providing a major portion of the shock dampening function of the vehicle suspension. Thus for construction vehicles, such as loaders and dump trucks, which operate at high speed a pneumatic tire is economically advantageous. In order to realize the benefits of the endless track and the pneumatic tire it is highly desirous to combine the armor protection of a traction plate with the high speed capability of a pneumatic tire.

Many attempts to armor tires using plates held in position on the tire by means of chains, links, cables, etc. have been tried for special applications. Specific examples of tracks linked over tires are shown by U.S. Pat. No. 3,601,212 to Peterson, et al and to U.S. Pat. No. 3,612,624 to Stedman. These adaptations of linked tracks and pneumatic tires provide for a shock dampening advantage as well as tire armoring, however, the linked track limits the speed of the vehicle due to the high frictional heat build-up in the linking components which may cause a high rate of wear.

The troublesome link track systems of early evolutionary developments have been improved upon by several inventions as typified by the invention disclosed in U.S. Pat. No. 3,773,394 to Grawey. In this invention the traction plates are fastened to anchor plates which accommodate a plurality of independent circumferential belts. This belt structure is positioned on the crown of a pneumatic tire and the tire is inflated into the belt and track assembly. The belts have been formed and cured before their assembly with the anchor plates and traction plates. A continuous interior belt surface contacts the pneumatic tire carcass and provides frictional engagement therewith.

Although the state of the art flexible belt system of linking track shoes together is operational this two piece tire and belt system does present some drawbacks. For instance, as the circumferential belts are on the exterior surface of the tire carcass they are exposed to abrasive dirt and foreign material which may shorten the service life of the expensive belt assembly.

Also the two piece belt and tire embodiments depend on contact pressure between the tire carcass and the belt assembly for the transmission of torque as high torque forces present between the vehicle tire and the ground may cause the belt to slip on the tire thus decreasing efficiency. The driving lugs and/or alignment cavities of many contemporary embodiments which are molded into the tread surface of the tire to accommodate complementary protrusions on the exterior belt surface are not necessary with the Anchor Plate Tire as presented herein.

The armored tire of this invention is adapted to be mounted on a wheel for use on an earthworking or transporting vehicle. The tire comprises a carcass portion including a crown section wherein are molded a plurality of ancor plates retained in their location by anchor plies positioned circumferentially around the tire also molded into the crown portion of the tire carcass. Traction shoes or plates are fastened to the molded-in anchor plates and present a traction improving, puncture and damage preventing armored surface.

The present invention does not depend on external links or independent belts in order to provide attachment of the traction plates to the tires. The belt structure is not necessary as the anchor plates for locating the traction plates are molded into the tire carcass itself. In this embodiment the anchor plates and related anchor plies are not exposed to working environment contaminents and projectiles which may cause damage or premature belt failure.

It is, therefore, an object of this invention to present an armored tire which has track retaining anchor plates molded integrally with the carcass of the tire.

Another significant object of this invention is to present an armored tire that has no external belts, chains, or links.

A further object of this invention is to provide an armored tire that is compatible with large earthmoving vehicles and allows relatively high speed, good shock and vibration dampening characteristics, good tractive efficiency and excellent wear and damage resistance.

Other advantages of the Anchor Plate Tire herein disclosed are that the traction plates which would be fastened to the anchor plates will not move in either a circumferential or lateral direction as may happen with a two piece tire belt design. Also the rotational stability of the anchor plate around its own axis is greatly improved due to the integrity of the design. This consequently improves the stability of any traction plate or grouser plate fastened to the anchor plate.

The life expectancy of the anchor plies is also increased as the anchor plies will not be exposed to creeping and rotation of the anchor plates. The rigidity of the anchor plies contributes to decreasing the fatigue of the cables, fabric, and elastomer in the ply thus increasing the life of the tire.

Still another advantage of the Anchor Plate Tire is the ease of assembly when contrasted to the two piece belt-tire embodiment. The critical relationship between the outside diameter of the tire and the inside diameter of the enveloping belt is not present in the integral anchor plate tire.

SUMMARY OF THE INVENTION

In accordance with the invention a pneumatic tire is provided with a plurality of anchor plates molded into the carcass of the tire in the crown section thereof, between the inner construction plies or body plies and an anchor ply assembly. The anchor plates are provided with means to allow fastening of traction plates thereto and also may be equipped with optional structural bonding holes. A set of spacers, including two end spacers and one optional tapped center spacer, are provided to locate the traction plates to the anchor plates while providing controlled compression of the anchor plies.

Anchor plies are of a laminated construction consisting of elastomer plies, fabric plies, and nonextensible reinforcing filaments encased in an elastomer and are integrally molded with tire carcass. The reinforcing filaments are positioned to run circumferentially around the tire.

The Anchor Plate Tire is an integrally molded conventional pneumatic tire incorporating a bead type construction tire, an anchor plate arrangement and an anchor ply into an intergral unit. Traction plates are fastened to the anchor plates thus providing the assembly with an armored traction surface.

BRIEF DESCRIPTION OF THE DRAWINGS

The aforesaid and additional objects and advantages of the invention will be more clearly understood from the following detailed description thereof when read in conjunction with the accompanying drawings, in which:

FIG. 3 is a cross sectional view through plane 3—3 of FIG. 1 of an anchor plate tire having the traction plate and its fastening means disassembled;

FIG. 4 is a cross sectional view taken through plane 4—4 of FIG. 1 of an anchor plate tire having a traction plate in position;

FIG. 6 is a cross sectional view taken through plane 6—6 of FIG. 4 in the area in proximity to a single anchor plate;

FIG. 7 is an isometric view of an anchor plate of the invention;

FIG. 8 is a cross sectional view of an anchor plate tire having an alternative anchor plate;

FIG. 9 is a cross sectional view of an anchor plate tire having a traction plate in position on an alternative anchor plate; and FIG. 10 is a isometric view of an alternative anchor plate.

DETAILED DESCRIPTION OF THE INVENTION

Figure 1:
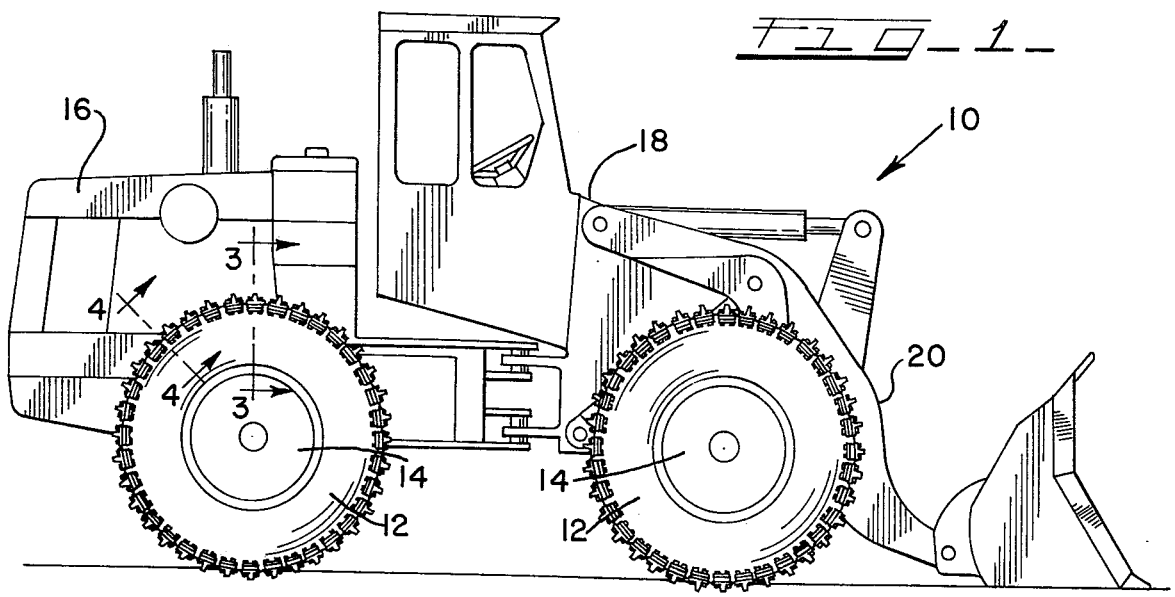
FIG. 1 is a side elevation view of a representative vehicle equipped with the anchor plate tire of this invention.
Figure 2:
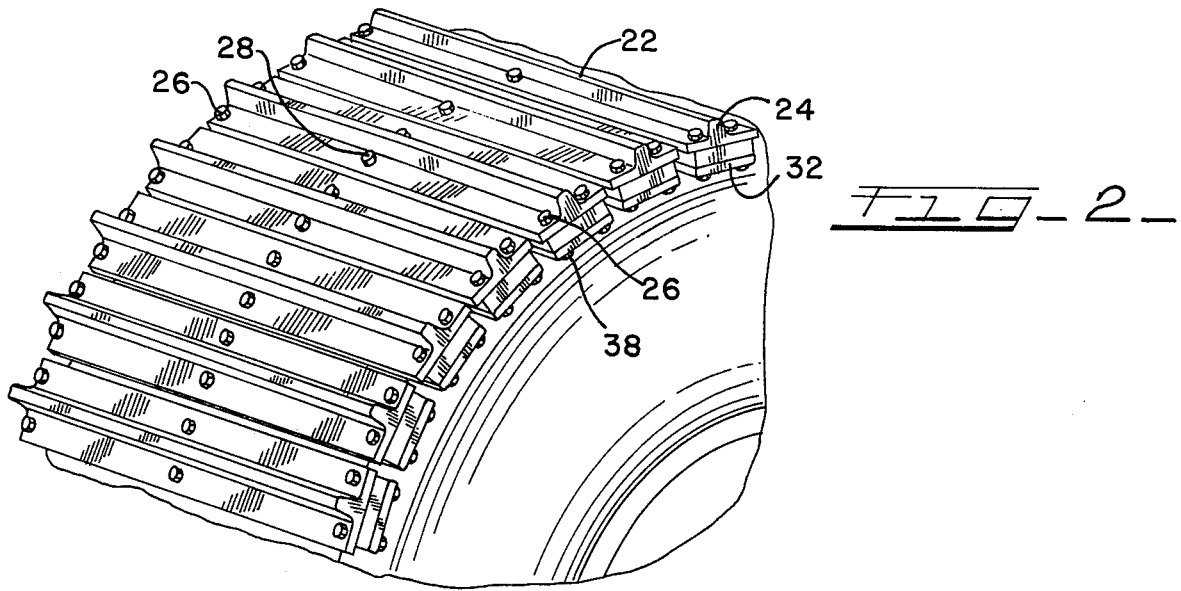
FIG. 2 is a perspective view of a portion of a wheel and anchor plate tire assembly.
Figure 5:
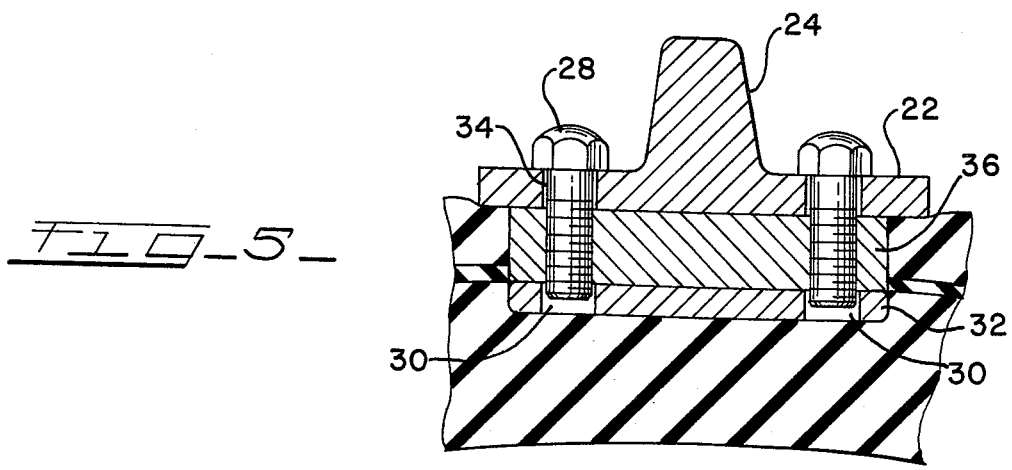
FIG. 5 is a cross sectional view taken through plane 5—5 of FIG. 4 of the area in proximity to a single anchor plate.

Referring first to FIG. 1 there is presented an earthworking vehicle generally 10, specifically a four wheel drive articulated loader, which has anchor plate tires fitted thereto. The earthworking vehicle shown is equipped with an engine supporting rear section 16, a cab supporting front section 18 and a loader boom and bucket assembly 20 used for excavating purposes. The right front 12 and identical right side rear, also 12, anchor plate tires are shown. The identical left side tires are hidden on the other side of the vehicle. The anchor plate tires are mounted on wheels 14 carried on the forward and rearward drive axles. A detailed view of the components included in the structure of the invention may be had upon examination of the annotated FIGS. 2 through 10.

Various views of traction plates 22 are presented. The traction plates are the actual ground engaging portion of the tire assembly. The figures show a single lug traction plate, the lug being the projection 24, however, it should be understood that the design of the traction plate surface is not critical to the concept behind the anchor plate tires. The traction plates may have a plurality of lugs arranged in a variety of configurations as desired.

The traction plates 22 are retained in position on the carcass of the anchor plate tire through the use of a fastening means such as bolts. In a first embodiment (FIGS. 2–7) the centrally located bolts 28 pass through a central spacer 36 which is affixed to the anchor plate 32, as by welding, and is appropriately tapped to receive the central bolts 28. The anchor plate may be equipped with an aperture 30.

The outboard bolts 26 pass first through mounting apertures 34 in the traction plates 22 then through apertured end spacers 52 which may be fixed to the anchor plates 32, which are also drilled to allow the passage of the outboard bolts 26. The outboard bolts are provided with nuts 38 which retain the traction plates 22 in position.

The anchor plates 32 are molded and cured into the carcass of the tire.

The tire shown in this embodiment is of radial construction having bead wire bundles 40 (FIGS. 3 and 4) in the bead section 42 of the carcass. Body plies 44 are composed of filaments which run transversely from bead to bead at virtually right angles thereto. The body plies of the tire are surrounded by an elastomer composition which makes up a portion of the tire sidewall 46 and the tread section 48 under the anchor plate 32.

The instant invention is equally adaptable to all known tire constructions. Conventional bias ply carcasses and toroidal style radial carcasses may be utilized with equally beneficial results. The tire carcass construction may be construed to limit the scope of this invention.

A relatively flat elastomer surface is formed in the crown portion of the carcass. This flat portion may be associated with the normal tread surface of a conventional tire.

The anchor plates are molded into the tire carcass on top of the crown portion thereof.

Anchor plates are generally rectangular having relatively flat top and bottom surfaces.

The anchor plate is built around a base portion which is a rectangular flat plate having a length of several times its width and a thickness a fraction of its width. These dimensions are determined per design as necessary. The anchor plate is of sufficient length to allow protrusion of the end portions thereof past the edge extremes of the tire carcass in the crown area. The anchor plate may protrude at least sufficiently far to enable the installation of the outboard fastening means, specifically outboard bolts 26 and nuts 38. The nuts may be either the self-locking type as shown or may be dependent on washers (not shown) to ensure adequate holding ability. The intersecting planes, such as the top surface and the sides, as well as the bottom surface and the sides, are radiused as seen at 50 in FIG. 6 and FIG. 7 to prevent internal damage to the tire. The apertured end spacers 52, the central spacers 36 as well as the radiused edges 50 are clearly shown in the anchor plate embodiment of FIG. 7. Also shown are a plurality of structural bonding holes similar to the bonding hole 54. The bonding holes allow for the extrusion of elastomer thereinto during the molding of the tire to further assist in positioning the anchor plate. The number of bonding holes may be varied (or entirely deleted) according to the design requirements of the carcass elastomer.

Returning to the cross sectioned figures the anchor plies will be further explained. In FIG. 3 an elastomer lining 56 is positioned between a first fabric breaker ply 58 and the top flat surface of the anchor plate 32. Between anchor plates the elastomer lining 56 becomes continuous with the elastomer of the tread section 48.

A stabilizer ply 60 comprising a plurality of inextensible filaments encapsulated or insulated in elastomer is positioned between the first fabric breaker ply 58 and a second fabric breaker ply 62. The inextensible filaments of the stabilizer ply would most aptly be metallic wires or cables, however, the use of a synthentic inextensible filament is also contemplated.

An elastomer cap 64 completes the anchor ply assembly. The cap is the outer most component of the assembly. The cap top surface protrudes above the upper surface of the apertured end spacers 52 and the central spacer 36 such that when the traction plates 22 are fastened to the anchor plates 32 the elastomer cap on each of the anchor plies is compressed to provide positive sealing between the traction plate and the tire assembly. Traction plates so mounted would transmit a degree of driving torque by friction with the tire assembly although a greater percentage of driving torque is transmitted through the bolted connections.

Note that in FIG. 4 the elastomer of the cap 64 appears to project into the lower surface of the traction plate 22. Actually the traction plate is not deformed in this view but the elastomer cap 64 has been extruded between adjacent traction plates in plane 4—4 of FIG. 1, thus giving this impression.

In this first embodiment note that two identical anchor plies are incorporated. One of each of the anchor plies is assigned to each of the portions of the anchor plate between the apertured end spacers and the central spacer.

It is important to understand that all the components of the tire assembly, exclusive of the traction plates and the fastening means, have been assembled as a unit before being molded and cured. After being assembled the tire assembly is cured and the anchor plates and plies are unified with the carcass. The traction plates may be bolted to the anchor plates anytime after the tire has been cured. The traction plates of course would be replaceable and interchangeable such that in the event of a traction plate failure the defective traction plate could be removed from the anchor plate and a new traction plate could be bolted or fastened into its place. Also traction plates may be changed to more aggressive or more operational configurations as necessary.

A second embodiment contemplated as within the scope of this invention is shown in FIGS. 8, 9, and 10.

In this embodiment a single full width anchor ply is molded with an alternative anchor plate and the tire carcass.

The anchor plate shown in FIG. 10 is similar to the anchor plate shown as FIG. 7 with the exception of the absence of the central spacer and the lack of need for the tapped apertures in the anchor plate in line with the tapped apertures of the central spacer.

The configuration and operation of the tire assembly would be much like what has been pointed out in the first embodiment. The traction plates would compress the cured anchor ply as before only now the bolt for the central spacer would not be necessary as there is no central spacer.

In this embodiment, as in the first embodiment the elastomer of the crown portion of the tire would be extruded through the structural bonding holes 54 of the anchor plate as well as into the area between anchor plates.

Thus it is apparent that there has been provided in accordance with the invention, an anchor plate tire that fully satisfies the objects, aims and advantages set forth above. While the invention has been described in conjunction with specific embodiments thereof, it is evident that many alternatives, modifications and variations will be apparent to those skilled in the art in light of the foregoing description. For instance, it is conceivable that an anchor plate may be equipped with more than a single central spacer between the apertured end spacers thus necessitating the need for several side-by-side anchor plies. Accordingly, the invention as disclosed above is intended to embrace all such alternatives, modifications, and variations as fall within the spirit and broad scope of the appended claims.

What is claimed is:
1. A pneumatic tire comprising:
   a carcass portion having a partially opened toroidial cross section including bead sections, sidewall sections and a crown portion, said crown portion disposed centrally between said sidewall sections and diametrically opposite said opened portion between said bead sections; and
   a plurality of radially disposed anchor plates positioned on said flat crown portion; and
   an anchor ply circumferentially disposed around said crown portion of said pneumatic tire on top of said anchor plates wherein said pneumatic tire including said carcass portion, said anchor plates and said anchor ply is assembled, formed, and cured into a single unified assembly.

2. The invention disclosed in claim 1 wherein the pneumatic tire is mounted on a wheel having bead receiving portions for accepting said bead portions of said pneumatic tire whereby said wheel and said tire become a load bearing structure upon inflation of said structure.

3. The invention as disclosed in claim 1 wherein said anchor plates comprise:
 a rectangular base portion having radiused edges between the surfaces thereof;
 a first apertured end spacer affixed to the top surface of one end of said rectangular base;
 a second apertured end spacer affixed to the top surface of the other end of said rectangular base portion;
 a central spacer having apertures affixed to the top surface of said rectangular base portion located equidistant from said first and said second apertured end spacer, further having said apertures tapped to provide threads therein; and
 a plurality of structural bonding apertures to allow elastomer flow therethrough during the forming of said pneumatic tire.

4. The invention as described in claim 1 wherein said anchor ply may comprise:
 an elastomer lining as a first lamination of said anchor ply;
 a first fabric breaker ply as the second lamination of said anchor ply, being positioned on said elastomer lining;
 a stabilizer ply as the third lamination of said anchor ply, being positioned on said first fabric breaker;
 a second fabric breaker ply as the fourth lamination of said anchor ply, being positioned on said stabilizer ply whereby said stabilizer ply is laminated between said first and said second breaker plies;
 an elastomer cap as the fifth lamination of said anchor ply, being positioned on said second breaker ply, whereby said first breaker ply, said stabilizer ply, and said second breaker ply are laminated between said elastomer lining and said elastomer cap.

5. The invention in accordance with claim 4 wherein said stabilizer ply comprises a plurality of layers of parallel inextensible filaments insulated in elastomeric means common to the plurality of layers and to each filament.

6. The invention in accordance with claim 4 wherein said stabilizer ply comprises a plurality of parallel inextensible filaments insulated in elastomeric means common to the plurality of filaments.

7. The invention in accordance with claim 6 wherein said inextensible filaments are metallic cables.

8. The invention in accordance with claim 1 wherein said pneumatic tire further comprises:
 a plurality of radially disposed traction plates associated with each of said anchor plates;
 fastening means whereby said traction plates may be fastened to said anchor plates following the transmission of torque therebetween.

9. The invention in accordance with claim 8 wherein said traction plates have flat bottom surfaces whereby fastening to said anchor plates results in the compression of said anchor plies between said flat bottom surface of said traction plates and said anchor plate.

10. The invention in accordance with claim 1 wherein said anchor plates project past the sidewall extremes of said carcass.

* * * * *